Figure 1:
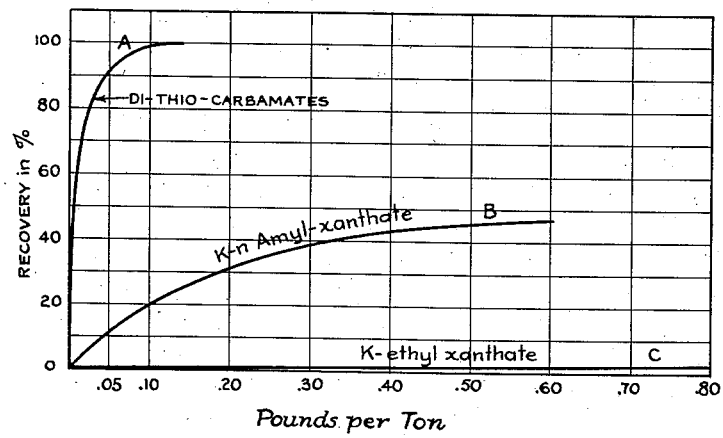

Sept. 27, 1932.  A. M. GAUDIN  1,879,871
METHOD OF FLOTATION
Filed Aug. 1, 1929

INVENTOR
Antoine M. Gaudin
BY
ATTORNEY

Patented Sept. 27, 1932

1,879,871

UNITED STATES PATENT OFFICE

ANTOINE M. GAUDIN, OF SALT LAKE CITY, UTAH

METHOD OF FLOTATION

Application filed August 1, 1929. Serial No. 382,761.

This discovery relates to the flotation of zinc-bearing materials to recover the same from either a pure mineral or a mixture containing a zinc-bearing mineral.

I have discovered that zinc-bearing minerals, of which sphalerite is a type, may be readily floated where a dithiocarbamate is used as a flotation reagent even in small quantities. Heretofore in the flotation of zinc-bearing minerals, it has been universally accepted practice, that an activator of some sort must be present such as soluble copper salts, for instance, copper sulphate. The ability of the dithiocarbamates to float zinc-iferous materials is particularly advantageous in pulps where the zinc-bearing material is unactivated. Other collectors such as ethyl xanthate, amyl xanthate, thiocarbanilid and numerous other reagents do not have this ability in unactivated pulps.

As an example I have demonstrated the remarkable ability as a collector of the substituted dithiocarbamates and particularly the substituted ammonium dithiocarbamates in this particular. While this discovery is not concerned with the method and preparation of the reagent, yet an efficient zinc collector may be produced by the additive reaction of di-iso amyl amine and carbon disulphide either in the pure state or preferably dissolved in some inert solvent such as ether. The reagent thus prepared is probably the di-iso amyl ammonium salt of di-iso amyl dithiocarbamic acid.

I have illustrated diagrammatically in the accompanying drawing the use of a reagent as herein described when compared with other flotation reagents heretofore used.

Figure 2:
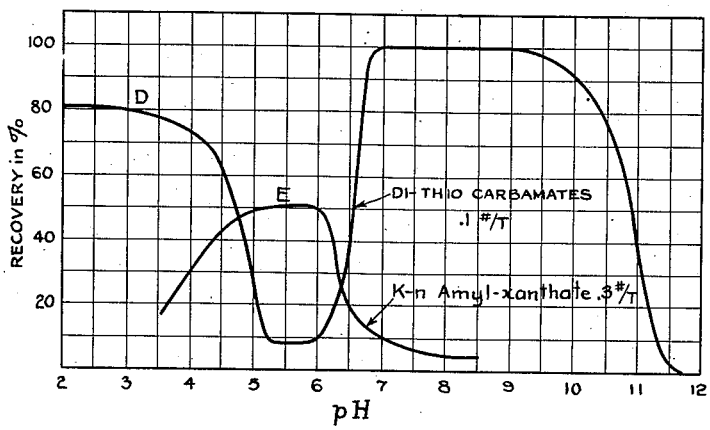

In the drawing:

Fig. 1 is a diagrammatic showing illustrating the results secured by subjecting sphalerite to a flotation operation with various concentrations of the present reagent as compared with two alkyl xanthates, and Fig. 2 is a diagrammatic showing of the comparative recovery of zinc from a pulp by subjecting the same to a flotation operation with the present reagent and a xanthate, indicating the most desirable hydrogen ion concentrations.

Referring with particularity to the diagram of Fig. 1 I have illustrated at A a graph showing the recovery of sphalerite from a pulp containing the same, which indicates that a 100% recovery may be had in concentrations of approximately $\frac{1}{10}$ lb. per ton using a dithiocarbamate as a flotation reagent. Graph B illustrates the recovery using K-n-amyl xanthate as a reagent and graph C the results obtained by the use of K-ethyl xanthate. These comparative graphs illustrate clearly the desired advantages flowing from the use of the dithiocarbamates as flotation reagents.

Referring to Fig. 2, graph B illustrates the recovery of sphalerite from pulps containing the same where a dithiocarbamate has been used as a flotation reagent over different hydrogen ion concentrations. This graph indicates clearly that a fairly good recovery may be had where the pH of the pulp has a value up to 4 and that from this point on to neutral the recovery rapidly drops. A 100% recovery, however, may be had where the pH value of the pulp reaches a figure of 7 and from that point up to almost 10. From this point the recovery drops rapidly.

Graph E shows almost an opposite effect on recovery where the flotation reagent K-n-amyl xanthate, even though .3 lbs. per ton was used in comparison with $\frac{1}{3}$ of that amount for a dithiocarbamate.

From the above it will be seen that the dithiocarbamates and particularly the substituted ammonium dithiocarbamates, may be used to great advantage as flotation reagents for zinc-bearing materials of which sphalerite is a type, and that remarkable results are secured even with the use of as low a concentration as .1 lb. per ton thereof, particularly where the pH of the pulp has a value of 7 to 10.

The preparation of the sphalerite or other zinc-bearing materials for the flotation operation is that ordinarily used, and this discovery is not concerned therewith, but relates to the recovery thereof by flotation as set forth in the claims appended hereto.

What I claim is:

1. A method of recovering zinc which consists in subjecting a mineral containing a zinc compound to a froth flotation operation in the presence of a dithiocarbamate, the pH of the pulp being maintained between 7 and 10.

2. A method of recovering zinc which consists in subjecting a mineral containing a zinc compound to a froth flotation operation in the presence of a di-iso amyl ammonium salt of di-iso-amyl dithiocarbamic acid.

In testimony whereof, I have hereunto subscribed my name this 25th day of July, 1929.

ANTOINE M. GAUDIN.